US009221491B2

(12) United States Patent
Kodera

(10) Patent No.: US 9,221,491 B2
(45) Date of Patent: Dec. 29, 2015

(54) ELECTRIC POWER STEERING SYSTEM

(71) Applicant: JTEKT Corporation, Osaka-shi, Osaka (JP)

(72) Inventor: Takashi Kodera, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/464,198

(22) Filed: Aug. 20, 2014

(65) Prior Publication Data

US 2015/0066306 A1 Mar. 5, 2015

(30) Foreign Application Priority Data

Aug. 29, 2013 (JP) ................................ 2013-178491

(51) Int. Cl.
*A01B 69/00* (2006.01)
*B62D 5/04* (2006.01)

(52) U.S. Cl.
CPC .............. *B62D 5/0472* (2013.01); *B62D 5/049* (2013.01); *B62D 5/0463* (2013.01); *B62D 5/0466* (2013.01)

(58) Field of Classification Search
CPC .... B62D 5/0463; B62D 5/049; B62D 5/0481; B62D 5/0484
USPC .......................................................... 701/43
See application file for complete search history.

(56) References Cited

U.S. PATENT DOCUMENTS

| 2008/0033613 A1 | 2/2008 | Tamaizumi et al. |
| 2009/0281692 A1 | 11/2009 | Tamaizumi et al. |
| 2011/0232988 A1 | 9/2011 | Aoki et al. |

FOREIGN PATENT DOCUMENTS

| EP | 1134147 A2 | 9/2001 |
| EP | 2266862 A2 | 12/2010 |
| JP | A-2006-131191 | 5/2006 |
| JP | A-2009-269540 | 11/2009 |
| JP | A-2011-203091 | 10/2011 |

OTHER PUBLICATIONS

Feb. 3, 2015 Extended Search Report issued in European Application No. 14181839.3.

*Primary Examiner* — Michael D Lang
(74) *Attorney, Agent, or Firm* — Oliff PLC

(57) ABSTRACT

There is provided an electric power steering system that makes it possible to reduce an uncomfortable feeling given to a driver even when a detected steering torque value is held. The controller computes a detected steering torque value based on the detection signal, and provides compensation based on a compensation value to a basic current command value to compute a current command value. The controller executes feedback control for causing a current value of the motor to follow the current command value. The controller executes normal control in which the detected steering torque value is periodically updated and backup control in which periodic updating of the detected steering torque value and holding of the detected steering torque value are alternately executed. The controller switches compensation value between a compensation value used during execution of the normal control and a compensation value used during execution of the backup control.

16 Claims, 12 Drawing Sheets

F I G . 13
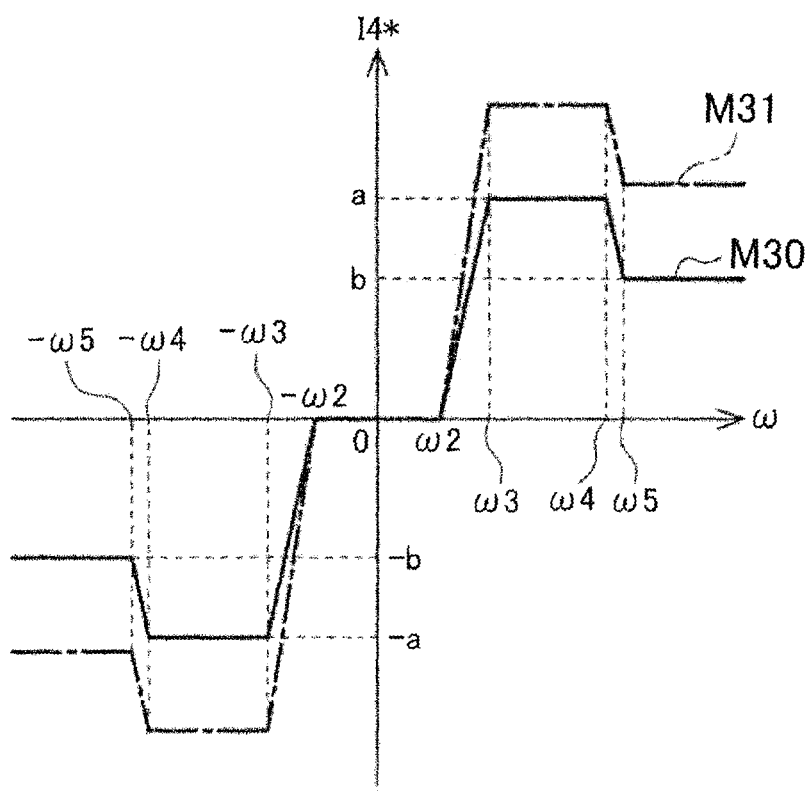

ELECTRIC POWER STEERING SYSTEM

INCORPORATION BY REFERENCE

The disclosure of Japanese Patent Application No. 2013-178491 filed on Aug. 29, 2013 including the specification, drawings and abstract, is incorporated herein by reference in its entirety.

BACKGROUND OF THE INVENTION

1. Field of the Invention

The invention relates to an electric power steering system that assists a vehicle steering operation.

2. Description of the Related Art

A conventional electric power steering system that assists a vehicle steering operation is described in Japanese Patent Application Publication No. 2011-203091 (JP 2011-203091 A). The electric power steering system includes a torque sensor and a controller that controls driving of a motor. The torque sensor includes a Hall IC and a magnetic circuit that applies magnetic flux corresponding to steering torque applied by a driver to the Hall IC. In the electric power steering system, when the steering torque varies in response to a driver's steering operation, the magnetic flux applied from the magnetic circuit to the Hall IC of the torque sensor varies. Thus, a detection signal corresponding to the steering torque is output from the torque sensor. The controller computes the steering torque on the basis of the detection signal from the torque sensor, and computes an assist command value on the basis of the detected steering torque value. Then, the controller controls driving of the motor to cause a torque output from the motor to follow the assist command value.

The electric power steering system described in JP 2011-203091 A includes a magnetic field generator that periodically applies a magnetic field to the torque sensor, aside from the magnetic circuit. When a magnetic field is applied to the torque sensor through the use of the magnetic field generator, the controller determines whether a signal based on the applied magnetic field is output from the torque sensor. When the signal based on the applied magnetic field is not output from the torque sensor, the controller determines that a malfunction has occurred in the torque sensor. The controller detects the steering torque on the basis of the detection signal from the torque sensor immediately before the magnetic field is applied to the torque sensor from the magnetic field generator, and the controller holds the detected steering torque value during a period in which the magnetic field is generated from the magnetic field generator.

In some electric power steering systems, a compensation value is computed based on, for example, a torque differential value, which is a first-order time differential value of the detected steering torque value, or an angular velocity of a motor, and compensation is provided to an assist command value based on the computed compensation value in order to improve the stability of a control system and the steering feel (refer to, for example, Japanese Patent Application Publication No. 2006-131191 (JP 2006-131191 A) and Japanese Patent Application Publication No. 2009-269540 (JP 2009-269540 A)).

As in the electric power steering system described in JP 2011-203091 A, when periodic updating and holding of the detected steering torque value are alternately executed, the characteristics of the control system are switched between the state where the detected steering torque value is periodically updated and the state where the steering torque is held, and thus the control system is likely to be unstable. If the control system is unstable, for example, vibrations are generated in a steering mechanism due to the assist torque. This may give an uncomfortable feeling to the driver.

SUMMARY OF THE INVENTION

One object of the invention is to provide an electric power steering system that makes it possible to reduce an uncomfortable feeling given to a driver even when a detected steering torque value is held.

An electric power steering system according to an aspect of the invention includes:
- a motor that applies assist force to a steering mechanism of a vehicle;
- a torque sensor that outputs a detection signal corresponding to a steering torque applied to the steering mechanism; and
- a controller that controls driving of the motor to cause an output torque of the motor to follow an assist command value.

The controller
- computes a detected steering torque value on the basis of the detection signal, and provides compensation to a basic assist command value based on the detected steering torque value with use of a compensation value to compute the assist command value,
- switches control mode between first control in which driving of the motor is controlled based on the detected steering torque value that is periodically updated continuously in a predetermined sampling cycle and second control in which driving of the motor is controlled based on at least a held detected steering torque value while a period in which the detected steering torque value is periodically updated and a period in which the detected steering torque value is held are alternately repeated, and
- switches the compensation value between a compensation value used when the first control is being executed and a compensation value used when the second control is being executed.

According to the above aspect, the compensation value is changed when a switchover is made between the state where the controller periodically updates the detected steering torque value continuously and the state where periodic updating of the detected steering torque value and holding of the detected steering torque value are alternately executed. That is, when the state is switched the state where a control system is likely to be unstable, the compensation value is changed to ensure the stability of the control system. Thus, it is possible to suppress vibrations of the steering mechanism due to assist torque. As a result, it is possible to reduce an uncomfortable feeling given to a driver.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 13 is a map used to compute a steering return compensation value I4* in the current command value computing unit according to the second embodiment.

DETAILED DESCRIPTION OF EMBODIMENTS

Figure 1:
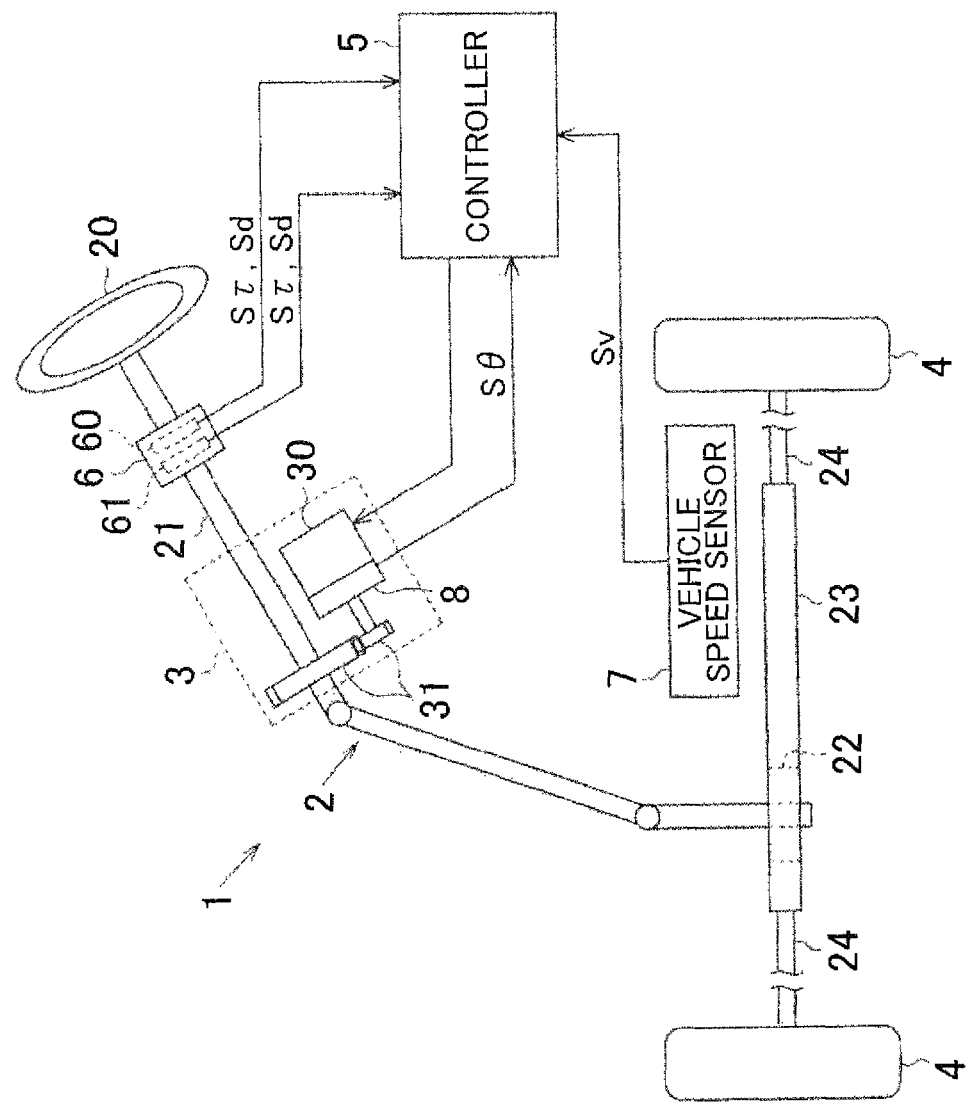
FIG. 1 is a block diagram illustrating the schematic configuration of an electric power steering system according to a first embodiment of the invention.

Hereinafter, a first embodiment of the invention will be described with reference to the accompanying drawings. As illustrated in FIG. 1, an electric power steering system 1 according to the present embodiment includes a steering mechanism 2 that steers steered wheels 4 in response to a driver's operation of a steering wheel 20, and an assist mechanism 3 that assists the driver's steering operation.

The steering mechanism 2 includes a steering shaft 21, which serves as a rotary shaft of the steering wheel 20, and a rack shaft 23 disposed at a lower end of the steering shaft 21 and connected to the steering shaft 21 via a rack-and-pinion mechanism 22. In the steering mechanism 2, when the steering shaft 21 rotates in response to the driver's operation of the steering wheel 20, the rotation of the steering shaft 21 is converted into a linear reciprocating motion of the rack shaft 23 in its axial direction by the rack-and-pinion mechanism 22. The linear reciprocating motion of the rack shaft 23 is transmitted to the steered wheels 4 via tie rods 24 connected to respective ends of the rack shaft 23. As a result, the steered angle of the steered wheel 4 is changed and thus the travelling direction of the vehicle is changed.

The assist mechanism 3 includes a motor 30 that applies assist force (assist torque) to the steering shaft 21. A brushless motor is used as the motor 30. The torque output from the motor 30 is transmitted to the steering shaft 21 via a speed reducer 31, so that the assist torque is applied to the steering shaft 21 to assist the steering operation.

The electric power steering system 1 is provided with various sensors that detect an operation amount of the steering wheel 20 and state quantities of the vehicle. For example, the steering shaft 21 is provided with a torque sensor 6. The torque sensor 6 has two sensor ICs 60, 61, which serve as detectors that detect a steering torque applied to the steering shaft 21 by the driver's steering operation. The torque sensor 6 has a redundant design structure in which a plurality of sensor ICs is provided. The sensor ICs 60, 61 have the same structure, and each output a voltage signal corresponding to the detected steering torque as a detection signal Sτ. The sensor ICs 60, 61 each output a malfunction diagnosis signal Sd having a predetermined waveform, instead of the detection signals Sτ, when power supply to the sensor ICs 60, 61 is started.

The vehicle is provided with a vehicle speed sensor 7. The vehicle speed sensor 7 detects a travelling speed of the vehicle, and outputs a voltage signal corresponding to the detected vehicle speed as a detection signal Sv. The motor 30 is provided with a rotation angle sensor 8. The rotation angle sensor 8 detects a rotation angle of the motor 30 and outputs a voltage signal corresponding to the detected motor rotation angle as a detection signal Sθ. The signals output from the sensors 6 to 8 are input into a controller 5. The controller 5 controls driving of the motor 30 on the basis of the signals output from the sensors 6 to 8.

Figure 2:
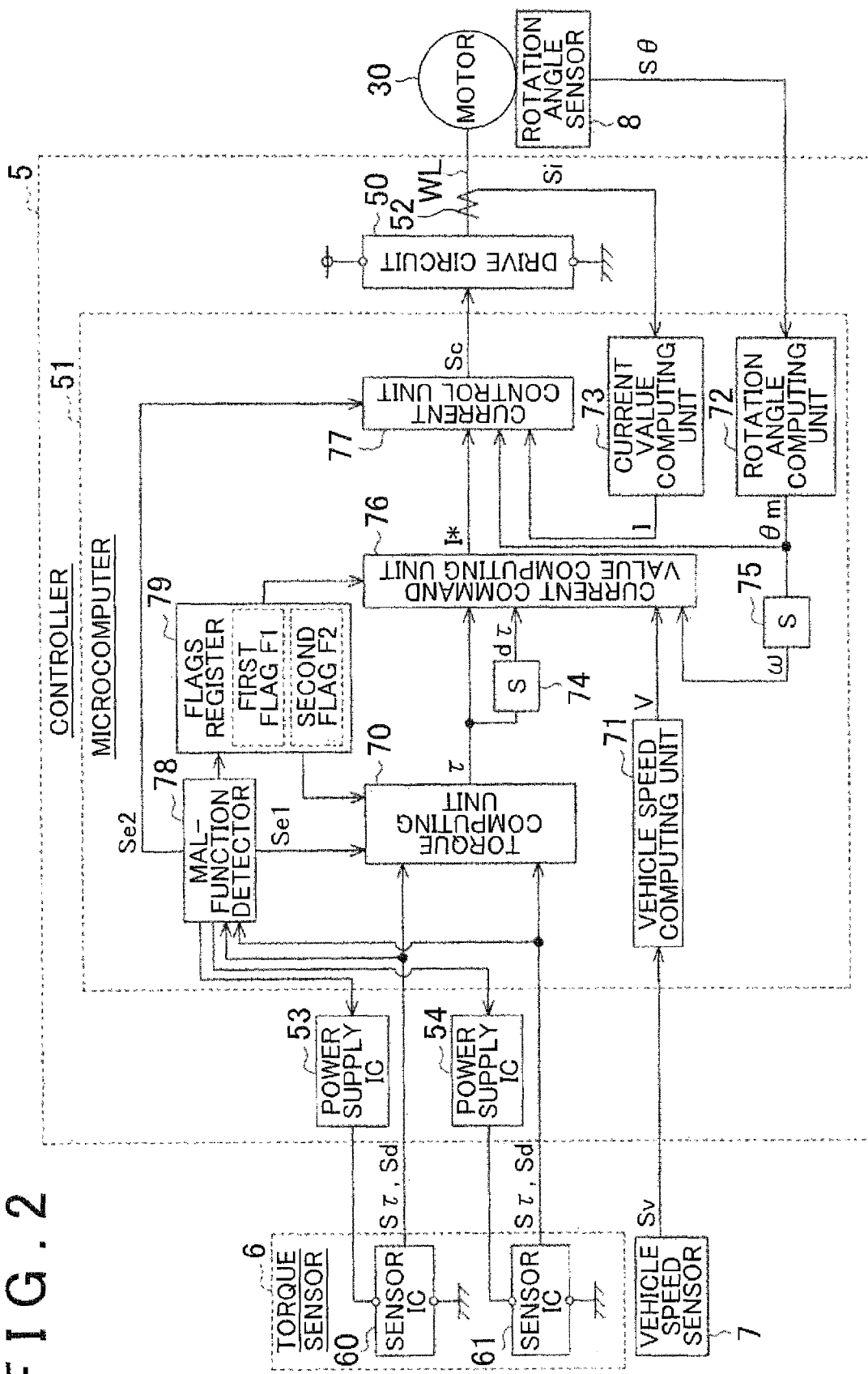
FIG. 2 is a block diagram illustrating the configuration of a controller of the electric power steering system according to the first embodiment.

As illustrated in FIG. 2, the controller 5 includes a drive circuit 50 that supplies driving electric power to the motor 30, and a microcomputer 51 that controls driving of the motor 30 through the use of the drive circuit 50. The drive circuit 50 converts DC power from a power source into three-phase AC power on the basis of a control signal Sc (PWM drive signal) from the microcomputer 51, and supplies the three-phase AC power to the motor 30 via three-phase power supply lines WL. A pulse width modulation (PWM) signal is used as the control signal Sc. Each of the three-phase power supply lines WL is provided with a current sensor 52. In FIG. 2, for the purpose of convenience of explanation, the three-phase power supply lines WL are collectively illustrated as one power supply line WL, and the three-phase current sensors 52 are collectively illustrated as one current sensor 52. The current sensors 52 detect three-phase current values, which are values of three-phase currents flowing through the power supply lines WL, and output voltage signals corresponding to the detected three-phase current values as detection signals Si to the microcomputer 51.

Various signals output from the sensors 6 to 8 and 52 are input into the microcomputer 51. The microcomputer 51 generates the control signal Sc on the basis of the various signals output from the sensors 6 to 8 and 52. The microcomputer 51 executes PWM drive control on the drive circuit 50 by outputting the control signal Sc to the drive circuit 50, and thus drives the motor 30.

Next, the drive control on the motor 30, which is executed by the microcomputer 51, will be described in detail. The microcomputer 51 includes a plurality of computing units 70 to 73 that compute detected values of various state quantities on the basis of the detection signals output from the sensors 6 to 8 and 52. The torque computing unit 70 computes a detected steering torque value τ on the basis of the detection signals Sτ output from the torque sensor 6. In the present embodiment, the positive and negative signs of the detected steering torque value τ are defined such that a steering torque of the steering wheel 20 in the right steering direction is expressed by a positive value and a steering torque of the steering wheel 20 in a left steering direction is expressed by a negative value. The vehicle speed computing unit 71 computes a detected vehicle speed value V on the basis of the detection signal Sv output from the vehicle speed sensor 7.

The motor rotation angle computing unit 72 computes a detected motor rotation angle value θm on the basis of the detection signal Sθ output from the rotation angle sensor 8. In the present embodiment, the positive and negative signs of the detected motor rotation angle value θm are defined in the following manner. The state where the steering wheel 20 is at a neutral position is used as a reference state, and a rotation angle of the steering wheel 20 in the right steering direction is expressed by a positive value and a rotation angle of the steering wheel 20 in the left steering direction is expressed by a negative value. The phase current value computing unit 73 computes three-phase detected current values I on the basis of the detection signals Si output from the current sensors 52. The microcomputer 51 has a torque differential value computing unit 74 that computes a torque differential value dτ that is a first-order time differential value of the detected steering torque value τ, and a motor angular velocity computing unit 75 that computes a motor angular velocity ω that is a first-order time differential value of the detected motor rotation angle value θm.

The detected steering torque value τ computed by the torque computing unit 70, the detected vehicle speed value V computed by the vehicle speed computing unit 71, the torque differential value dτ computed by the torque differential value computing unit 74, and the motor angular velocity ω computed by the motor angular velocity computing unit 75 are input into a current command value computing unit 76. The current command value computing unit 76 computes a current command value I* based on the detected steering torque value τ, the detected vehicle speed value V, the torque differential value dτ, and the motor angular velocity ω. The current command value I* is a target value of a current applied to the motor 30. In the present embodiment, the current command value I* corresponds to an assist command value that is a target value of an output torque of the motor 30.

Figure 3:
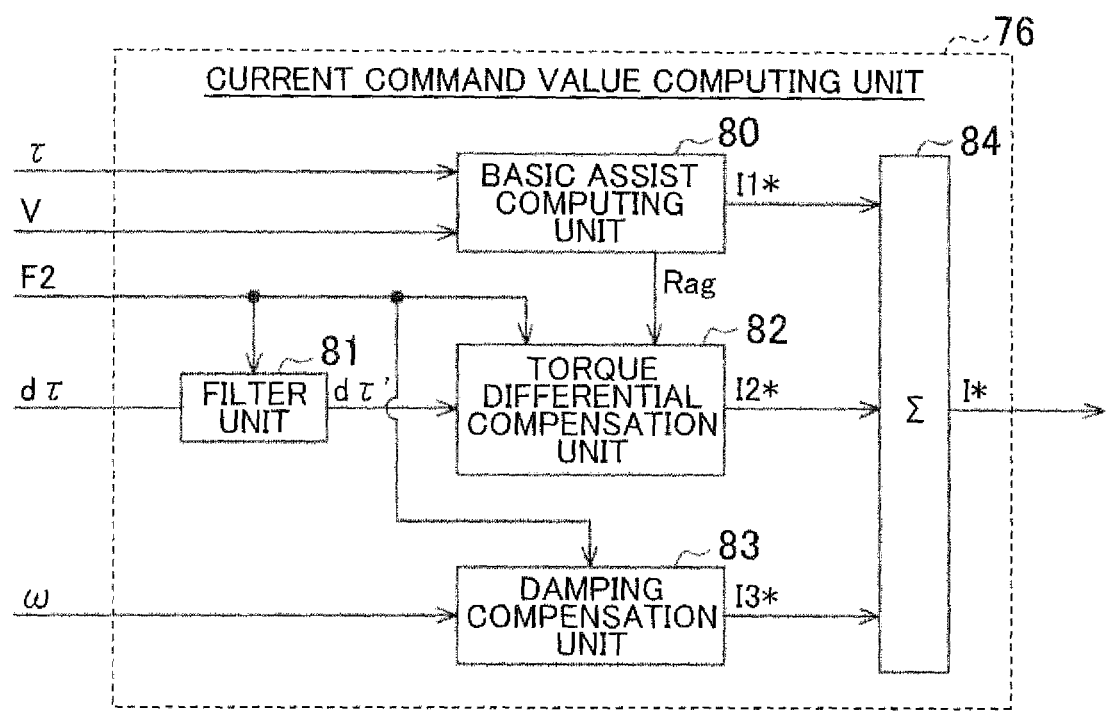
FIG. 3 is a block diagram illustrating the configuration of a current command value computing unit of the controller according to the first embodiment.
Figure 4:
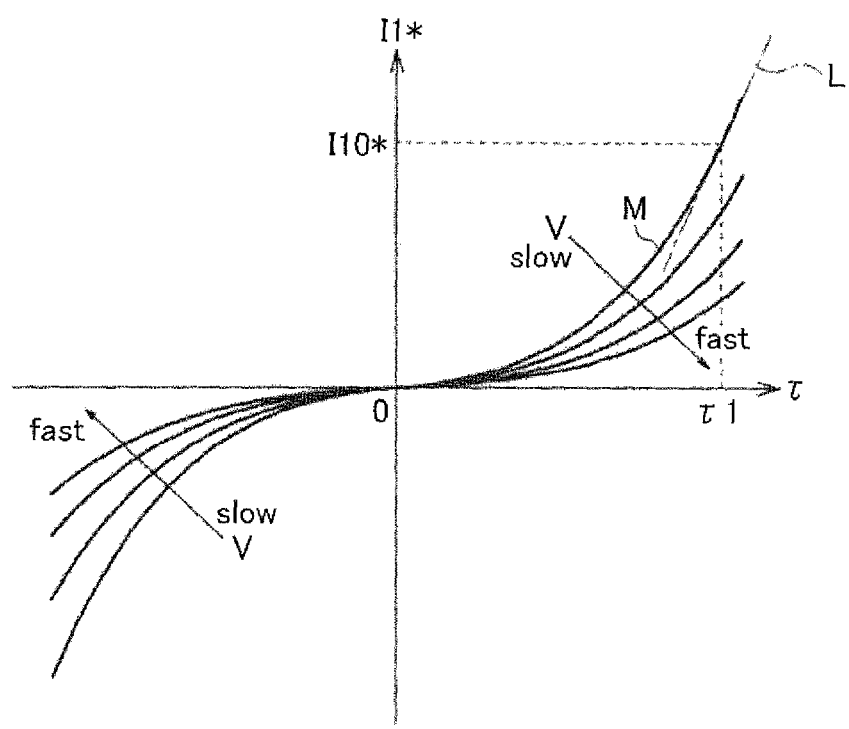
FIG. 4 is a map used to compute a basic current command value I1* in the controller according to the first embodiment.

As illustrated in FIG. 3, the current command value computing unit 76 has a basic assist computing unit 80 that computes a basic current command value I1* based on the detected steering torque value τ and the detected vehicle speed value V. The basic current command value I1* is a basic component of the current command value I* for causing the motor 30 to generate an appropriate output torque corresponding to the detected steering torque value τ and the detected vehicle speed value V. The basic current command value I1* corresponds to a basic assist command value. The basic assist computing unit 80 has a map that indicates the relationship among the detected steering torque value τ, the detected vehicle speed value V, and the basic current command value I1* as illustrated in FIG. 4, and computes the basic current command value I1* based on the map. The map is set such that the basic current command value I1* has a positive correlation with the detected steering torque value τ, and the basic current command value I1* has a negative correlation with the detected vehicle speed value V. When the basic current command value I1* is computed, the basic assist computing unit 80 computes an assist gradient Rag that represents the rate of change in the basic current command value I1* with respect to a change in the detected steering torque value τ at the time at which the basic current command value I1* is computed. The assist gradient Rag may be expressed by the gradient of a tangent to a map curve illustrated in FIG. 4. That is, when the basic current command value I1* is computed from a detected steering torque value τ1 based on a map curve M illustrated in FIG. 4, the basic assist computing unit 80 computes a gradient of a tangent L at the detected steering torque value τ1 in the map curve M, as the assist gradient Rag.

As illustrated in FIG. 3, the current command value computing unit 76 has a filter unit 81 that executes a filtering process on the torque differential value dτ. The current command value computing unit 76 also has a torque differential compensation unit 82 that computes a torque differential compensation value I2* based on a torque differential value dτ' obtained through the filtering process, and a damping compensation unit 83 that computes a damping compensation value I3* based on the motor angular velocity ω. The torque differential compensation value I2* and the damping compensation value I3* are compensation components for the basic current command value I1*. The torque differential compensation value I2* is a compensation component for securing the stability of a control system or for suppressing reverse input vibrations transmitted from the steered wheels 4 to the steering mechanism 2. The damping compensation value I3* is a compensation component for suppressing a an abrupt change in the rotation angle of the motor to suppress a an abrupt change in the steering angle to improve the steering feel.

Figure 5:
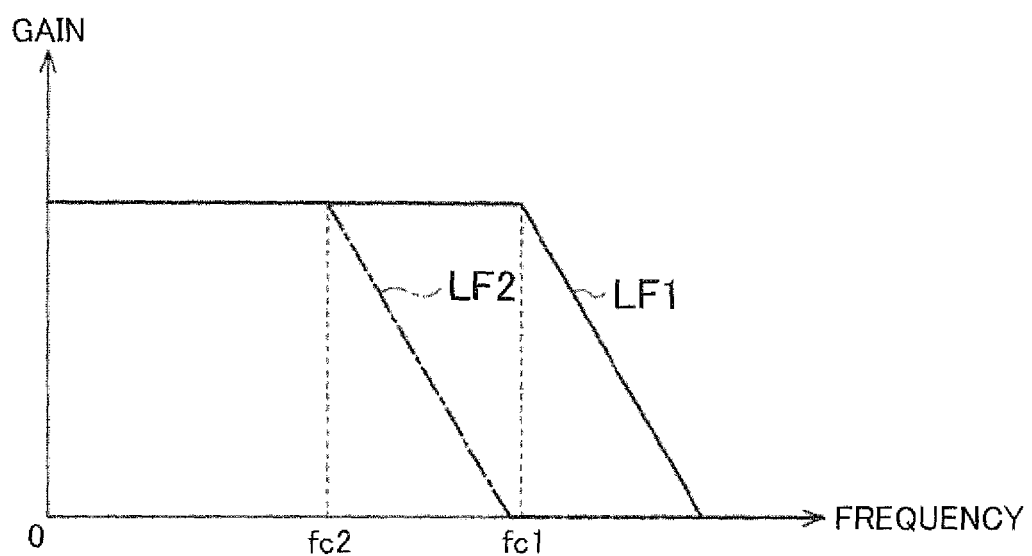
FIG. 5 is a gain diagram indicating the filter characteristics of a filter unit that executes a filtering process on a torque differential value in the controller according to the first embodiment.

The filter unit 81 has a low-pass filter that removes a high-frequency component of the torque differential value dτ as illustrated in a gain diagram in FIG. 5. The filter unit 81 is configured such that the filter characteristic of the filter unit 81 may be changed. Specifically, the filter unit 81 has a first filter characteristic LF1 that is indicated by a continuous line in FIG. 5, and of which the cutoff frequency is set to fc1, and a second filter characteristic LF2 of which the cutoff frequency is set to fc2 that is lower than fc1. In the filter unit 81, the filter characteristic is selectively switched to one of the first filter characteristic LF1 and the second filter characteristic LF2.

As illustrated in FIG. 3, the torque differential value dτ' obtained through the filtering process by the filter unit 81 and the assist gradient Rag computed by the basic assist computing unit 80 are input into the torque differential compensation unit 82. The torque differential compensation unit 82 computes the torque differential compensation value I2* based on the torque differential value dτ' and the assist gradient Rag. Specifically, as illustrated in FIG. 6, the torque differential compensation unit 82 has a basic compensation value computing unit 82a that computes a basic compensation value I2b*, which is a basic component of the torque differential compensation value I2*, based on the torque differential value dτ', and a gain computing unit 82b that computes a gain G based on the assist gradient Rag.

Figure 6:
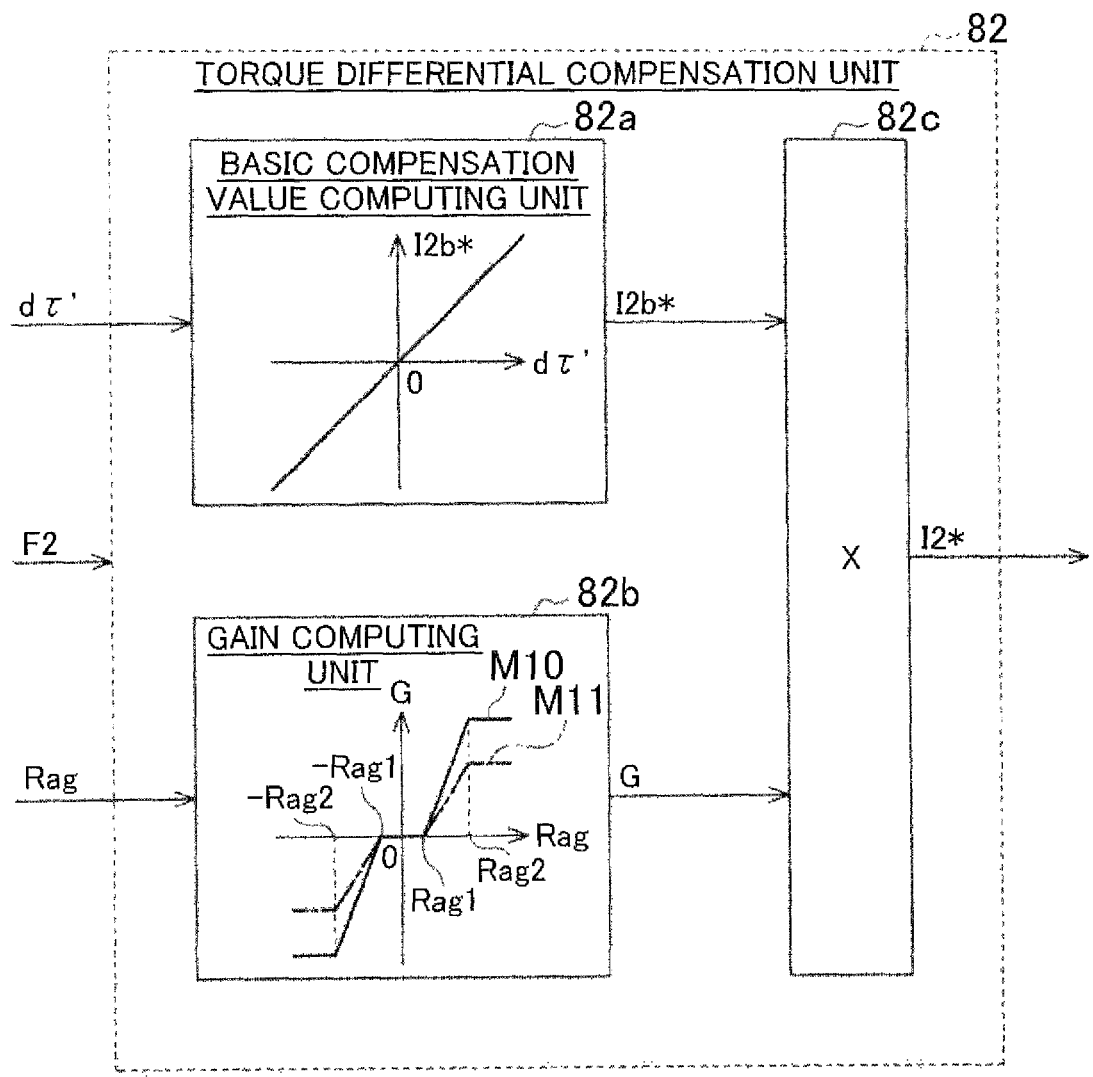
FIG. 6 is a block diagram illustrating the configuration of a torque differential compensation unit of the controller according to the first embodiment.

The basic compensation value computing unit 82a has a map that indicates the relationship between the torque differential value dτ' and the basic compensation value I2b* as illustrated in FIG. 6, and computes the basic compensation value I2b* based on the map. The map is set such that the basic compensation value I2b* has a positive correlation with the torque differential value dτ'.

The gain computing unit 82b has a first map M10 and a second map M11 respectively indicated by a continuous line and an alternate long and short dash line in FIG. 6, as maps each indicating the relationship between the assist gradient Rag and the gain G. The first map M10 and the second map M11 are set such that the gain G has a positive correlation with the assist gradient Rag. Specifically, in the first map M10 and the second map M11, when the absolute value of the assist gradient Rag is smaller than a prescribed value Rag1 (>0), the gain G is set to zero. In the first map M10 and the second map M11, when the absolute value of the assist gradient Rag is equal to or larger than a prescribed value Rag2 (>Rag1), the gain G is held at a constant value. Further, in the first map M10 and the second map M11, when the absolute value of the assist gradient Rag is equal to or larger than the prescribed value Rag1 and smaller than the prescribed value Rag2, the gain G has a positive correlation with the assist gradient Rag. The second map M11 is set such that the absolute value of the computed gain G is smaller than that in the first map M10. The gain computing unit 82b computes the gain G based on one of the first map M10 and the second map M11.

The basic compensation value I2b* computed by the basic compensation value computing unit 82a and the gain G computed by the gain computing unit 82b are input into a multiplier 82c. The multiplier 82c multiplies the basic compensation value I2b* by the gain G to compute the torque differential compensation value I2*. The torque differential compensation unit 82 outputs the torque differential compensation value I2* computed by the multiplier 82c to an adder 84 illustrated in FIG. 3.

In the torque differential compensation unit 82, when the second map M11 is used in the gain computing unit 82b, the absolute value of the torque differential compensation value I2* is set smaller than that when the first map M10 is used in the gain computing unit 82b. Thus, the effects of torque differential compensation are reduced.

Figure 7:
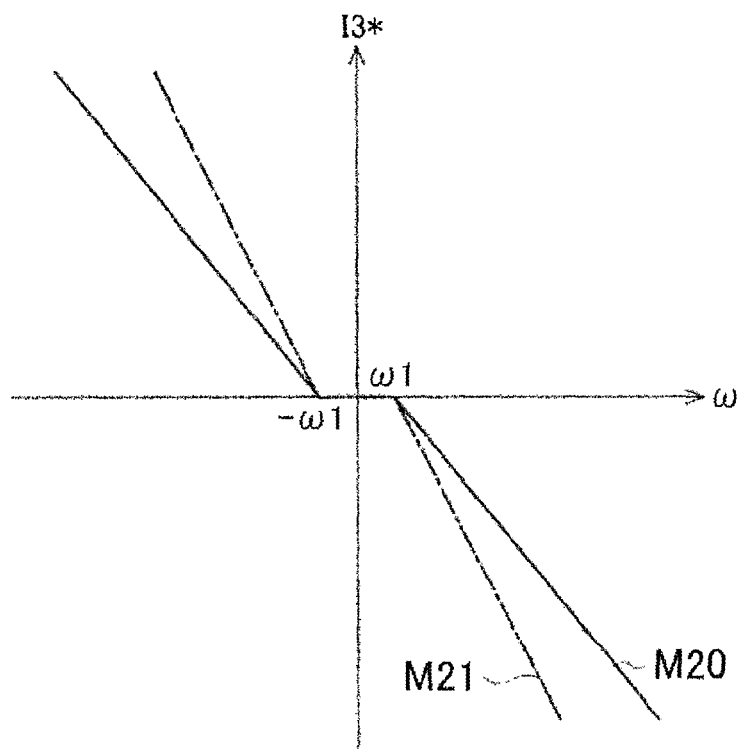
FIG. 7 is a map used to compute a damping compensation value I3* in the controller according to the first embodiment.

The damping compensation unit 83 has a first map M20 and a second map M21 respectively indicated by a continuous line and an alternate long and short dash line in FIG. 7, as a map indicating the relationship between the motor angular velocity c and the damping compensation value I3*. In the first map M20, when the absolute value of the motor angular velocity ω is smaller than a prescribed value ω1, the damping compensation value I3* is set to zero. In the first map M20, when the absolute value of the motor angular velocity ω is equal to or larger than the prescribed value ω1, the damping compensation value I3* is set to have a negative correlation with the motor angular velocity ω. The second map M21 is set such that the absolute value of the computed damping compensation value I3* is larger than that in the first map M20. That is, in the damping compensation unit 83, when the second map M21 is used, a higher damping effect is obtained than when the first map M20 is used. The damping compensation unit 83 computes the damping compensation value I3* based on one of the first map M20 and the second map M21.

As illustrated in FIG. 3, the basic current command value I1* computed by the basic assist computing unit 80, the torque differential compensation value I2* computed by the torque differential compensation unit 82, and the damping compensation value I3* computed by the damping compensation unit 83 are input into the adder 84. The adder 84 adds together the basic current command value I1*, the torque differential compensation value I2*, and the damping compensation value I3* to compute the current command value I*. The current command value computing unit 76 outputs the current command value I* computed by the adder 84 to a current control unit 77 illustrated in FIG. 2.

As illustrated in FIG. 2, the current command value I* computed by the current command value computing unit 76, the detected motor rotation angle value θm computed by the motor rotation angle computing unit 72, and the detected three-phase current values I computed by the current value computing unit 73 are input into the current control unit 77. The current control unit 77 converts the detected three-phase current values I into a d-axis current value and a q-axis current value of a d/q coordinate system with the use of the detected motor rotation angle value θm. The current control unit 77 executes current feedback control for causing the d-axis current value and the q-axis current value to follow the current command value I* to compute a d-axis voltage command value and a q-axis voltage command value. Then, the current control unit 77 converts the d-axis voltage command value and the q-axis voltage command value into three-phase voltage command values with the use of the detected motor rotation angle value θm. The current control unit 77 outputs the control signal Sc based on the three-phase voltage command values to the drive circuit 50, thereby executing PWM control on the drive circuit 50. Thus, driving electric power according to the control signal Sc is supplied from the drive circuit 50 to the motor 30, and the drive control of the motor 30 is executed.

The controller 5 includes power supply ICs 53, 54 that supply operating electric power to the sensor ICs 60, 61, respectively. The power supply ICs 53, 54 adjust a voltage supplied from a power supply, such as an in-vehicle battery, to operating voltages suitable for the sensor ICs 60, 61, and apply the adjusted operating voltages to the sensor ICs 60, 61, respectively. Thus, the operating electric power for the sensor ICs 60, 61 is secured. The power supply ICs 53, 54 execute shutoff of power supply and restart of power supply to the sensor ICs 60, 61 based on a command from the microcomputer 51.

Figure 8:
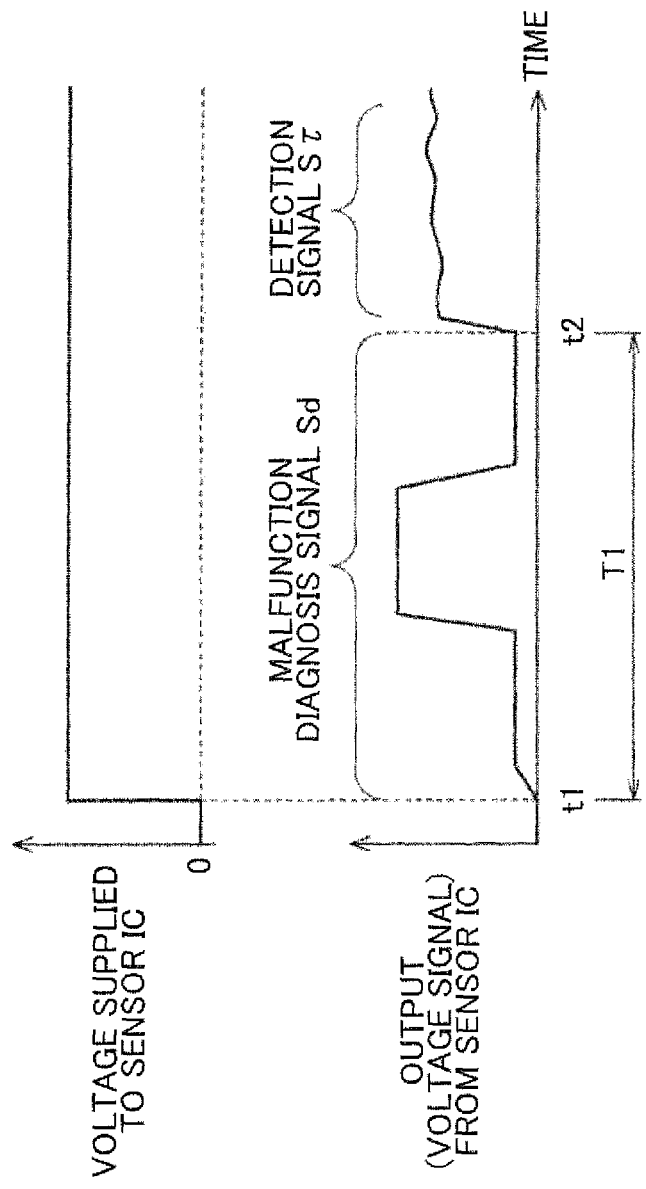
FIG. 8 is a timing chart illustrating transition in the voltage supplied to a sensor IC, and transition in an output from the sensor IC in the torque sensor according to the embodiment.

Next, the operations of the sensor ICs 60, 61 will be described. As illustrated in FIG. 8, when power supply to the sensor ICs 60, 61 is started at time t1, the output signals (voltage signals) from the sensor ICs 60, 61 change as illustrated in FIG. 8. That is, the sensor ICs 60, 61 each output the malfunction diagnosis signal Sd having a predetermined waveform for a predetermined period T1. Then, the sensor ICs 60, 61 each output the detection signal Sτ after time t2 at which the output of the malfunction diagnosis signals Sd is completed.

When some sort of malfunction occurs in any one of the sensor ICs 60, 61, the sensor IC 60, 61, which is malfunctioning, outputs the malfunction diagnosis signal Sd having a waveform different from the predetermined waveform. Based on this malfunction diagnosis signal Sd, the microcomputer 51 detects occurrence of a malfunction in the sensor IC 60, 61 on the basis of a change in the malfunction diagnosis signal Sd output from each of the sensor ICs 60, 61.

Next, a method of detecting a malfunction in the sensor ICs 60, 61 and a method of computing the detected steering torque value τ, which are executed by the microcomputer 51, will be described. As illustrated in FIG. 2, the microcomputer 51 includes a malfunction detector 78 that detects malfunctions in the sensor ICs 60, 61 based on the detection signals Sτ and the malfunction diagnosis signals Sd output from the sensor ICs 60, 61. The microcomputer 51 also has a FLAGS register 79 in which a first flag F1 and a second flag F2 are set by the malfunction detector 78.

When the sensor ICs 60, 61 are both operating properly, the malfunction detector 78 compares the detection signals Sτ output from the sensor ICs 60, 61 from each other, thereby monitoring whether a malfunction occurs in the sensor ICs 60, 61. When the sensor ICs 60, 61 are both operating properly, the torque computing unit 70 computes the detected steering torque value τ in a predetermined cycle based on at least one of the detection signals Sτ output from the sensor ICs 60, 61.

As described above, when the sensor ICs 60, 61 are both operating properly, the controller 5 executes, as the normal control, processes a1), a2) described below.

a1) Driving of the motor 30 is controlled while the detected steering torque value τ is updated in a predetermined sampling cycle based on at least one of the detection signals Sτ output from the sensor ICs 60, 61.

a2) Whether a malfunction occurs in the sensor ICs 60, 61 is monitored based on comparison between the detection signals ST output from the sensor ICs 60, 61.

In the present embodiment, the normal control in which the processes a1), a2) is executed is the first control.

When the malfunction detector 78 detects a malfunction in one of the sensor ICs 60, 61 by executing malfunction detection based on the comparison between the detection signals Sτ, the malfunction detector 78 outputs a malfunction detection signal Se1 indicating the occurrence of the malfunction, to the torque computing unit 70. When receiving the malfunction detection signal Se1 from the malfunction detector 78, the torque computing unit 70 determines the malfunctioning sensor IC among the sensor ICs 60, 61 based on the malfunction detection signal Se1. After this, the torque computing unit 70 computes the detected steering torque value τ based on only the detection signal Sτ output from the properly operating sensor IC in which no malfunction is detected. When the malfunction detector 78 detects a malfunction in one of the sensor ICs 60, 61, the malfunction detector 78 stops power supply to the sensor IC in which a malfunction is detected, and periodically executes shutoff of power supply and restart of power supply to the properly-operating sensor IC in which no malfunction is detected, through the use of the power supply ICs 53, 54. Thus, the malfunction detector 78 causes the remaining sensor IC, in which no malfunction is detected, to alternately output the detection signal Sτ and the malfunction diagnosis signal Sd, and monitors whether a malfunction occurs in the remaining sensor IC based on the malfunction diagnosis signal Sd.

As described above, when a malfunction in a first sensor IC among the sensor ICs 60, 61 is detected, as backup control, the controller 5 causes a second sensor IC in which no malfunction is detected to alternately output the malfunction diagnosis signal Sd and the detection signal Sτ and monitors whether a malfunction occurs in the second sensor IC based on the malfunction diagnosis signal Sd while continuing the drive control of the motor 30 based on the detection signal Sτ. In the present embodiment, the backup control is the second control.

Next, the backup control will be described in detail with reference to FIG. 9. Note that, for convenience of explanation, the case where a malfunction is detected in the sensor IC 61 through malfunction detection based on the comparison between the detection signals Sτ and the sensor IC 60 is operating properly will be described as one example.

Figure 9:
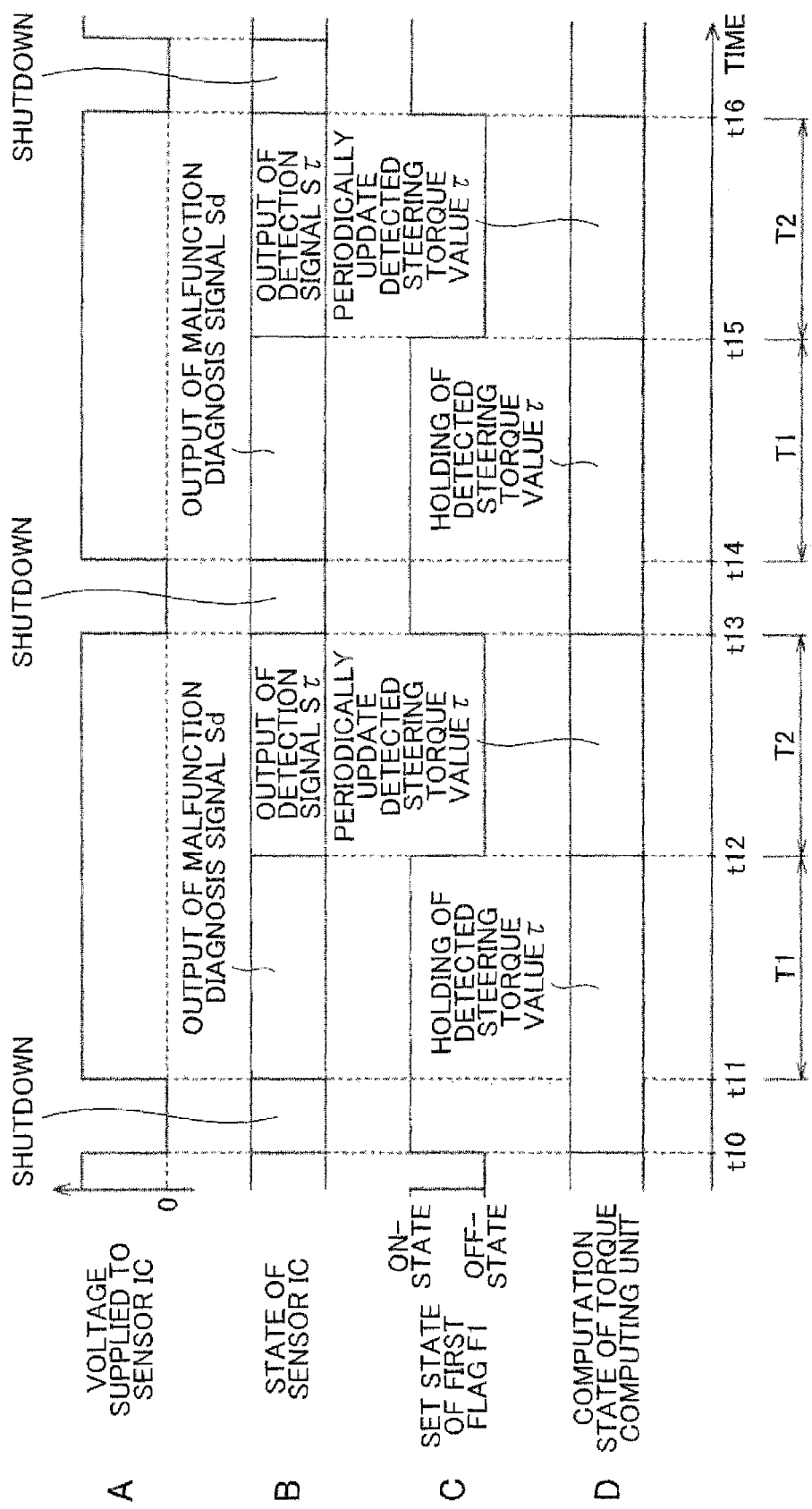
FIG. 9 is a timing chart illustrating graph A: transition in the voltage supplied to the sensor IC, graph B: transition in the state of the sensor IC, graph C: transition in the set state of a first flag F1, graph D: transition in the computation state of a torque computing unit in the electric power steering system according to the first embodiment.

As illustrated in graph A in FIG. 9, the malfunction detector 78 temporarily stops the supply of electric power to the sensor IC60, for example, at time t10 during execution of the backup control, and then restarts the supply of electric power to the sensor IC60 at time t11. Thus, as illustrated in graph B in FIG. 9, the sensor IC60 is temporarily shut down and then starts output of the malfunction diagnosis signal Sd. The sensor IC60 outputs the malfunction diagnosis signal Sd over a period from time t11 at which the supply of electric power is restarted until time t12 at which the predetermined period T1 has elapsed from time t11. At this time, the malfunction detector 78 determines whether the malfunction diagnosis signal Sd output from the sensor IC60 has a predetermined waveform. The malfunction detector 78 determines that the sensor IC60 is operating properly when the malfunction diagnosis signal Sd has the predetermined waveform, whereas determines that the sensor IC 60 is malfunctioning when the malfunction diagnosis signal Sd does not have the predetermined waveform.

When the sensor IC60 is operating properly, as illustrated in graph A and graph B in FIG. 9, the malfunction detector 78 continues supply of electric power to the sensor IC 60 from time t12 to time t13 at which a predetermined period T2 has elapsed from time t12, and thus the sensor IC60 outputs the detection signal Sτ from time t12 to time t13. The malfunction detector 78 stops the supply of electric power to the sensor IC60 again at time t13 and then restarts the supply of electric power to the sensor IC60 at time t14. Thus, the sensor IC 60 is shut down at time t13 and then outputs the malfunction diagnosis signal Sd again at time t14. At this time, the malfunction detector 78 determines again whether the sensor IC60 is malfunctioning on the basis of the malfunction diagnosis signal Sd output from the sensor IC60. Then, the malfunction detector 78 alternately causes the sensor IC60 to output the malfunction diagnosis signal Sd and the detection signal Sτ by periodically executing stopping of the supply of electric power to the sensor IC60 and restarting of the supply of electric power. The malfunction detector 78 determines whether the sensor IC60 is malfunctioning each time the sensor IC60 outputs the malfunction diagnosis signal Sd.

When a malfunction of the sensor IC60 is detected on the basis of the malfunction diagnosis signal Sd output from the sensor IC60, the malfunction detector 78 outputs a malfunction detection signal Se2 to the current control unit 77 as illustrated in FIG. 2. When the current control unit 77 receives the malfunction detection signal Se2 from the malfunction detector 78, the current control unit 77 executes fail-safe control, for example, control of stopping the output of the control signal Sc to the drive circuit 50 to stop the motor 30, in order to ensure the safety of the electric power steering system 1.

As illustrated in graph C in FIG. 9, the malfunction detector 78 sets the first flag F1 to an on-state in a period from the time point at which the supply of electric power to the sensor IC 60 is stopped to the time point at which it is confirmed that the output of the detection signal Sτ from the sensor IC60 is started. The malfunction detector 78 sets the first flag F1 to an off-state during a period in which the sensor IC60 outputs the detection signal Sτ. The torque computing unit 70 computes and holds the detected steering torque value τ on the basis of the set state of the first flag F1. When the sensor ICs 60, 61 are both operating properly, the malfunction detector 78 sets the second flag F2 of the FLAGS register 79 illustrated in FIG. 2 to the off-state. When the malfunction detector 78 detects a malfunction in one of the sensor ICs 60, 61, the malfunction detector 78 sets the second flag F2 to the on-state.

That is, as illustrated in graph D in FIG. 9, when the first flag F1 is in the off-state, the torque computing unit 70 executes the computation and updating of the detected steering torque value τ based on the detection signal Sτ from the sensor IC 60 in a predetermined sampling cycle. When the second flag F2 is in the on-state, the torque computing unit 70 holds the immediately preceding value of the detected steering torque value τ, as the detected steering torque value τ. Thus, for example, the detected steering torque value τ is held at the value computed immediately before time t13 during a period from time t13 at which power supply to the sensor IC 60 is shut off to time t15 at which the output of the detection signal Sτ from the sensor IC 60 is started. Thus, the microcomputer 51 is able to continue drive control of the motor 30 in both the period in which the sensor IC60 is shut down and the period in which the malfunction diagnosis signal Sd is output from the sensor IC60.

Similarly, the backup control described above is executed by the controller 5 when a malfunction is detected in the sensor IC 60 through malfunction detection based on the comparison between the detection signals Sτ during execution of the normal control and the properly operating sensor IC is the sensor IC 61.

As described above, when a malfunction in the first sensor IC among the sensor ICs 60, 61 is detected, the controller 5 executes, as the backup control, processes b1) to b3) described below.

b1) The second sensor IC, which is properly operating, is caused to alternately output the malfunction diagnosis signal Sd and the detection signal Sτ.

b2) Driving of the motor 30 is controlled based on the updated detected steering torque value τ while the periodic computation and updating of the detected steering torque value τ are executed based on the detection signal Sτ during a period in which the detection signal Sτ is output from the second sensor IC, which is operating properly.

b3) Whether a malfunction occurs in the properly-operating second sensor IC is determined based on the malfunction diagnosis signal Sd during a period in which the malfunction diagnosis signal Sd is output from the properly-operating second sensor IC. Driving of the motor 30 is controlled based on the held detected steering torque value T while the detected steering torque value τ computed during a period in which the detection signal Sτ is output is held.

The controller 5 according to the present embodiment switches the torque differential compensation value I2* and the damping compensation value I3* between the values used when the normal control is executed and the values used when the backup control is executed. Next, a method of switching the torque differential compensation value I2* and the damping compensation value I3* by the controller 5 will be described.

As described above, when the sensor ICs 60, 61 are both operating properly, the malfunction detector 78 according to the present embodiment sets the second flag F2 of the FLAGS register 79 illustrated in FIG. 2 to the off-state. When a malfunction is detected in one of the sensor ICs 60, 61, the malfunction detector 78 sets the second flag F2 to the on-state. As a result, the second flag F2 is set to the off-state when the controller 5 executes the normal control, and is set to the on-state when the controller 5 executes the backup control. The set state of the second flag F2 is input into the current command value computing unit 76. Specifically, as indicated by a signal line indicated by F2 in FIG. 3, the set state of the second flag F2 is input into the filter unit 81, the torque differential compensation unit 82, and the damping compensation unit 83. The filter unit 81 switches the filter characteristic based on the set state of the second flag F2. The torque differential compensation unit 82 and the damping compensation unit 83 switch the computation maps based on the set state of the second flag F2.

Figure 10:
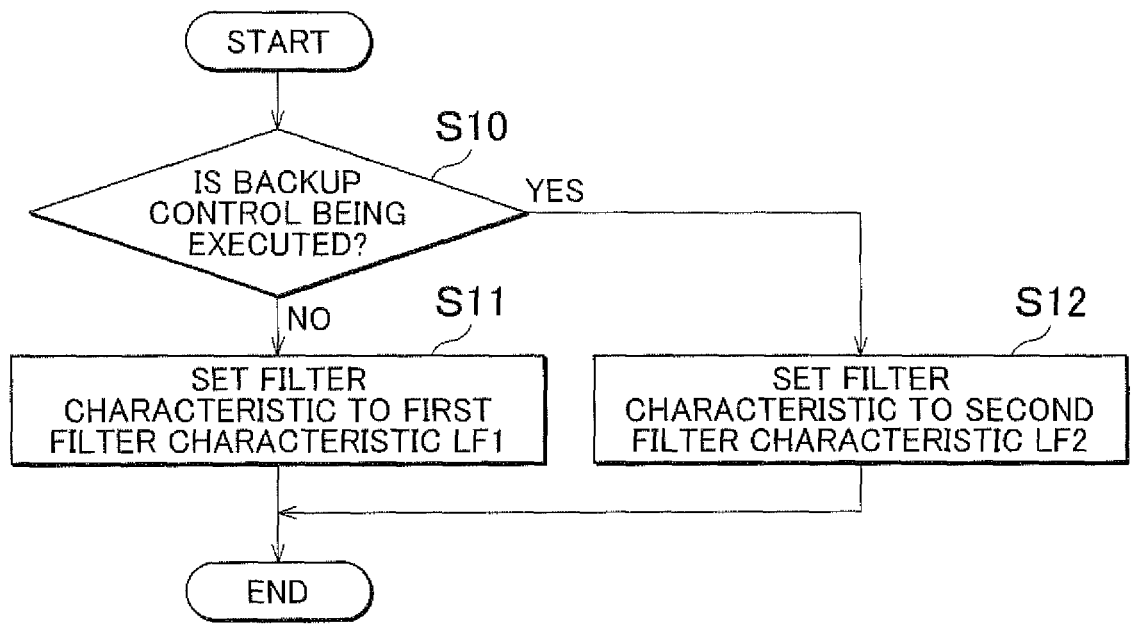
FIG. 10 is a flowchart illustrating the procedure of a process for switching the filter characteristics of the filter unit, which is executed by the controller according to the first embodiment.

Next, a process for changing the filter characteristic, which is executed by the filter unit 81, will be described with reference to FIG. 10. As illustrated in FIG. 10, the filter unit 81 determines whether the backup control is being executed based on the set state of the second flag F2 (Step S10). When it is determined that the backup control is not being executed (Step S10: NO), that is, when the normal control is being executed, the filter unit 81 sets the filter characteristic to the first filter characteristic LF1 illustrated in FIG. 5 (Step S11). On the other hand, when it is determined that the backup control is being executed (Step S10: YES), the filter unit 81 sets the filter characteristic to the second filter characteristic LF2 illustrated in FIG. 5 (Step S12).

Figure 11:
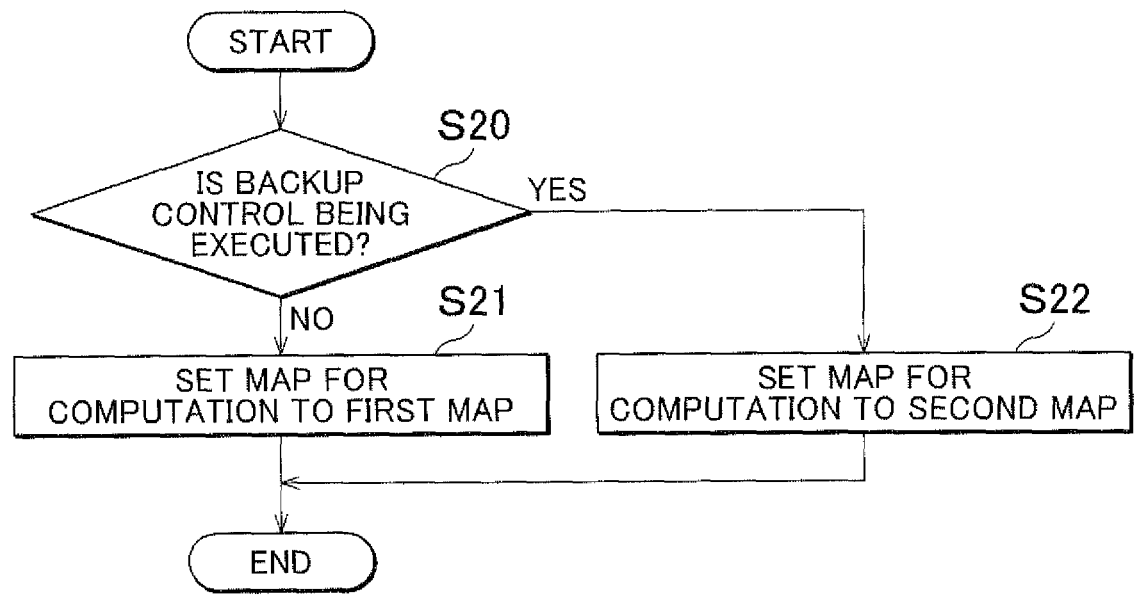
FIG. 11 is a flowchart illustrating the procedure of a process for switching the compensation value computation maps, which is executed by the controller according to the first embodiment.

Next, a process for changing computation maps that are used in the torque differential compensation unit 82 and the damping compensation unit 83 will be described with reference to FIG. 11. As illustrated in FIG. 11, the torque differential compensation unit 82 and the damping compensation unit 83 determine whether the backup control is being executed based on the set state of the second flag F2 (Step S20). When it is determined that the backup control is not being executed (Step S20: NO), that is, when the normal control is being executed, each of the torque differential compensation unit 82 and the damping compensation unit 83 sets the computation map to the first map (Step S21). Specifically, the torque differential compensation unit 82 sets the gain computation map to the first map M10 illustrated in FIG. 6. The damping compensation unit 83 sets the compensation value computation map to the first map M20 illustrated in FIG. 7. On the other hand, when it is determined that the backup control is being executed (Step S20: YES), each of the torque differential compensation unit 82 and the damping compensation unit 83 sets the computation map to the second map (Step S22). Specifically, the torque differential compensation unit 82 sets the gain computation map to the second map M11 illustrated in FIG. 6. The damping compensation unit 83 sets the compensation value computation map to the second map M21 illustrated in FIG. 7.

Next, the operation of the electric power steering system 1 according to the present embodiment will be described. When the controller 5 is executing the backup control, as illustrated in FIG. 9, the periodic updating and holding of the detected steering torque value τ are alternately executed. Therefore, there is a possibility that the control system will be more unstable than when the normal control is being executed. That is, when the controller 5 makes switchover between the state where the detected steering torque value τ is periodically updated and the state where the detected steering torque value τ is held, the detected steering torque value and the manner of a change in the detected steering torque value may change abruptly. Thus, the torque differential value dτ may change abruptly. An abrupt change in the torque differential value dτ causes an excessive output of the torque differential compensation value I2*. This may be a factor of destabilization of the control system.

However, in the electric power steering system 1 according to the present embodiment, during execution of the backup control, the filter characteristic of the filter unit 81 illustrated in FIG. 5 is switched from the first filter characteristic LF1 to the second filter characteristic LF2, and a high-frequency component in the torque differential value dτ is removed. Thus, it is possible to suppress an abrupt change in the torque differential value dτ' that is used for the computation by the torque differential compensation unit 82. During execution of the backup control, the computation map of the gain computing unit 82b illustrated in FIG. 6 is switched from the first map M10 to the second map M11. That is, the gain G of the torque differential compensation value I2* is decreased. The absolute value of the torque differential compensation value I2* is decreased with a change in the gain G. With the suppression of an abrupt change in the torque differential value dτ' and a decrease in the absolute value of the torque differential compensation value I2 *, it is possible to suppress an excessive output of the torque differential compensation value I2*, whereby it is possible to secure the stability of the control system.

In the electric power steering system 1, during execution of the backup control, the computation map of the damping compensation unit 83 illustrated in FIG. 7 is switched from the first map M20 to the second map M21. That is, the absolute value of the damping compensation value I3* is increased. Thus, it is possible to suppress an abrupt change in the angular velocity of the motor 30 with execution of the backup control, whereby it is possible to improve the stability of the control system.

In this way, in the electric power steering system 1, it is possible to secure the stability of the control system even during execution of the backup control. Thus, vibrations of the steering mechanism 2 due to assist torque are suppressed, whereby it is possible to reduce an uncomfortable feeling that is given to a driver.

As described above, with the electric power steering system 1 according to the present embodiment, the following advantageous effects are obtained.

1) When the sensor ICs 60, 61 of the torque sensor 6 are both operating properly, the controller 5 controls, as the normal control, driving of the motor 30 while updating the detected steering torque value τ based on the detection signals Sτ output from the sensor ICs 60, 61 in a predetermined sampling cycle. On the other hand, when a malfunction is detected in the first sensor IC among the sensor ICs 60, 61, the controller 5 causes the second sensor IC, in which no malfunction is detected, to alternately output the malfunction diagnosis signal Sd and the detection signal Sτ. When the malfunction is detected, as the backup control, the controller 5 executes the drive control of the motor 30 while periodically updating the detected steering torque value τ during a period in which the detection signal Sτ is output from the second sensor IC, whereas the controller 5 5 executes the drive control of the motor 30 while holding the detected steering torque value τ during a period in which the malfunction diagnosis signal Sd is output from the properly-operating sensor IC. Then, the controller 5 monitors whether a malfunction occurs in the second sensor IC based on the malfunction diagnosis signal Sd. Thus, even when only one sensor IC is operating properly, it is possible to continue the drive control of the motor 30 while monitoring whether a malfunction occurs.

2) During execution of the backup control, the controller 5 makes the absolute value of the torque differential compensation value I2* smaller than that during execution of the normal control. Thus, when the backup control is being executed, an excessive output of the torque differential compensation value I2* is suppressed, whereby it is possible to secure the stability of the control system.

3) During execution of the backup control, the controller 5 makes the cutoff frequency of the filter unit 81 smaller than that during execution of the normal control. Thus, it is possible to suppress an abrupt change in the torque differential compensation value I2*, whereby it is possible to secure the stability of the control system.

4) During execution of the backup control, the controller 5 makes the absolute value of the damping compensation value I3* larger than that during execution of the normal control. Thus, it is possible to suppress an abrupt change in the angular velocity of the motor 30 with execution of the backup control, whereby it is possible to improve the stability of the control system.

5) The controller 5 switches the maps for computing the compensation values I2*, I3* in order to switch the torque differential compensation value I2* and the damping compensation value I3* between the values used when the normal control is executed and the values used when the backup control is executed. Thus, it is possible to easily change the compensation values I2*, I3*.

Next, a second embodiment of the invention will be described. Hereinafter, description will be provided mainly on the difference from the first embodiment.

Figure 12:
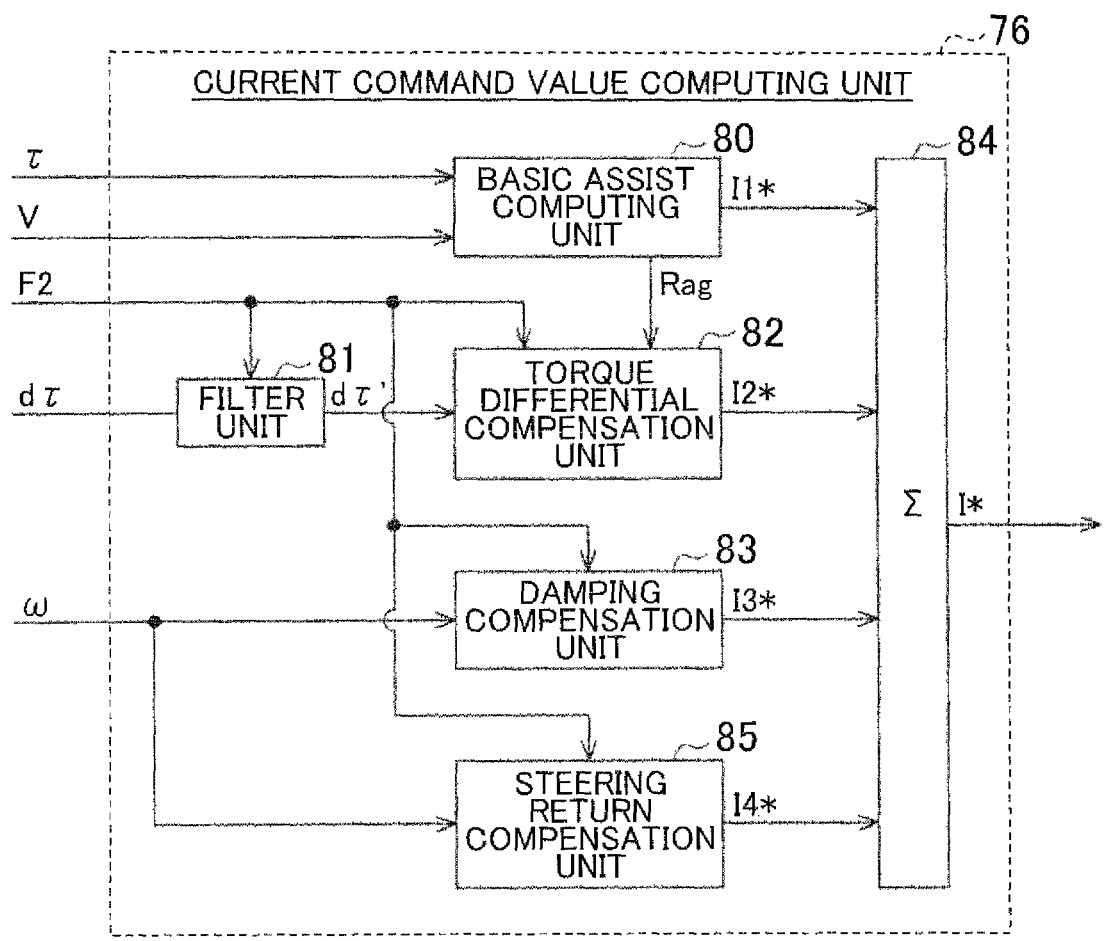
FIG. 12 is a block diagram illustrating the configuration of a current command value computing unit of a controller in an electric power steering system according to a second embodiment of the invention.

As illustrated in FIG. 12, a current command value computing unit 76 according to the present embodiment includes a steering return compensation unit 85 that computes a steering return compensation value I4* based on the motor angular velocity (o. The steering return compensation unit 85 outputs the steering return compensation value I4* when it is determined that the steering wheel 20 is returned by a known device or a known method. The steering return compensation value I4* is a compensation component for returning the steering wheel 20 to the neutral position.

As in the first embodiment, when the absolute value of the damping compensation value I3* is increased during execution of the backup control, it is possible to suppress vibrations of the steering mechanism 2 due to assist torque, but the effect of the steering return compensation value is reduced as a trade-off. That is, the return performance of the steering wheel 20 to the neutral position is lowered. Thus, in the present embodiment, when the backup control is executed, the absolute value of the steering return compensation value I4* is made larger than that when the normal control is executed.

Specifically, the steering return compensation unit 85 has a first map M30 and a second map M31 respectively indicated by a continuous line and an alternate long and short dash line in FIG. 13 as maps indicating the relationship between the motor angular velocity ω and the steering return compensation value I4*. The first map M30 is set according to c1) to c5) described below.

c1) When the absolute value of the motor angular velocity ω is smaller than a prescribed value ω2 (>0), the steering return compensation value I4* is set to zero.

c2) When the absolute value of the motor angular velocity ω is equal to or larger than the prescribed value ω2 and smaller than a prescribed value ω3 (>ω2), the steering return compensation value I4* has a positive correlation with the motor angular velocity ω.

c3) When the absolute value of the motor angular velocity ω is equal to or larger than the prescribed value ω3 and smaller than a prescribed value ω4 (>ω3), the absolute value of the steering return compensation value I4* is held at a constant value a (>0).

c4) When the absolute value of the motor angular velocity ω is equal to or larger than the prescribed value ω4 and smaller than a prescribed value ω5 (>ω4), the steering return compensation value I4* has a negative correlation with the motor angular velocity ω.

c5) When the absolute value of the motor angular velocity ω is equal to or larger than the prescribed value ω5, the absolute value of the steering return compensation value I4* is held at a constant value b (<a). The second map M31 is set such that the absolute value of the computed steering return compensation value I4* is larger than that in the first map M30. That is, in the steering return compensation unit 85, when the second map M31 is used, the assist torque for returning the steering wheel 20 to the neutral position acts more largely than when the first map M30 is used. The steering return compensation unit 85 computes the steering return compensation value I4* based on one of the first map M30 and the second map M31.

As illustrated in FIG. 12, the set state of the second flag F2 of the FLAGS register 79 is input into the steering return compensation unit 85. The steering return compensation unit 85 executes a process illustrated in FIG. 11 based on the set state of the second flag F2. That is, when it is determined that the backup control is not being executed based on the set state of the second flag F2 (Step S20: NO), that is, when the normal control is being executed, the steering return compensation unit 85 sets the computation map to the first map M30. On the other hand, when it is determined that the backup control is being executed based on the set state of the second flag F2 (Step S20: YES), the steering return compensation unit 85 sets the computation map to the second map M31.

Next, the operation of the electric power steering system 1 according to the present embodiment will be described. In the electric power steering system 1 according to the present embodiment, during execution of the backup control, the computation map of the steering return compensation unit 85 illustrated in FIG. 13 is switched from the first map M30 to the second map M31. That is, the absolute value of the steering return compensation value I4* becomes larger. Thus, it is possible to secure the return performance of returning the steering wheel 20 to the neutral position, whereby it is possible to improve the steering performance of the vehicle.

As described above, with the electric power steering system 1 according to the present embodiment, in addition to the advantageous effects 1) to 5) of the first embodiment, the following advantageous effects 6), 7) are obtained.

6) During execution of the backup control, the controller 5 makes the absolute value of the steering return compensation value I4* larger than that during execution of the normal control. Thus, it is possible to secure the return performance of returning the steering wheel 20 to the neutral position during execution of the backup control whereby it is possible to improve the steering performance of the vehicle.

7) The controller 5 switches the maps for computing the steering return compensation value I4* in order to switch the steering return compensation value I4* between the value used when the normal control is executed and the value used when the backup control is executed. Thus, it is possible to easily change the steering return compensation value I4*.

The invention is may be implemented in the other embodiments described below. In the second embodiment, the steering return compensation value I4* is computed based on the motor angular velocity ω. However, the method of computing the steering return compensation value I4* may be changed as needed. For example, the steering return compensation value I4* may be computed based on the steering angle of the steering wheel 20. In this case, a map in which the steering return compensation value I4* has a negative correlation with the steering angle is prepared, and the steering return compensation value I4* is computed based on the map. That is, any method of computing the steering return compensation value I4* may be employed as long as the steering return compensation value I4* for returning the steering wheel 20 to the neutral position is computed as the compensation value for the basic current command value I1*.

In the above-described embodiments, the value immediately before power supply to the sensor ICs 60, 61 is shut off is used as the value at which the detected steering torque value τ is held. However, any value may be used as long as the value is based on the detected steering torque value τ computed during a period in which the detection signals Sτ are output from the sensor ICs 60, 61. For example, the average value of the detected steering torque values τ during a period in which the detection signals Sτ are output may be used.

In the above-described embodiments, both the torque differential compensation value I2* and the damping compensation value I3* are used as the compensation values for the basic current command value I1*. However, only one of the torque differential compensation value I2* and the damping compensation value I3* may be used.

In the above-described embodiments, the torque differential compensation value I2* is computed based on the torque differential value dτ' and the assist gradient Rag. However, the torque differential compensation value I2* may be computed based on only the torque differential value dτ'. In this case, for example, two computation maps indicating the relationship between the torque differential value dτ' and the torque differential compensation value I2* are prepared. Then, the torque differential compensation unit 82 the computation maps between the map used when the normal control is executed and the map used when the backup control is executed. The map used when the backup control is executed is set such that the absolute value of the computed torque differential compensation value I2* is smaller than that in the map used when the normal control is executed.

In the above-described embodiments, the filter unit 81 that removes the high-frequency component of the torque differential value dτ is provided. However, the filter unit 81 may be omitted. That is, the torque differential value dτ computed by the torque differential value computing unit 74 may be input, as it is, to the torque differential compensation unit 82.

In the above-described embodiments, the current command value I* is computed based on the detected steering torque value τ and the detected vehicle speed value V. However, the current command value I* may be computed based on only the detected steering torque value τ.

In the above-described embodiments, the damping compensation value I3* is computed based on the map illustrated in FIG. 7. However, for example, when the relationship between the motor angular velocity ω and the damping compensation value I3* is defined by a computation expression, the damping compensation value I3* may be computed based on the computation expression. Similarly, the basic current command value I1*, the torque differential compensation value I2*, or the steering return compensation value I4* may be computed by a computation expression. When the compensation values I2* to I4* are computed based on the computation expressions, the computation expressions for the compensation values I2* to I4* are switched between the computation expressions used when the backup control is executed and the computation expression used when the normal control is executed. Thus, the same advantageous effects as those in the above-described embodiments are obtained.

In the above-described embodiments, the sensor ICs 60, 61 output the malfunction diagnosis signals Sd spontaneously in response to the start of power supply to the sensor ICs 60, 61. However, the configuration for causing the sensor ICs 60, 61 to output the malfunction diagnosis signals Sd may be changed as needed. For example, the sensor ICs 60, 61 may output the malfunction diagnosis signals Sd based on a command from the microcomputer 51. In this case, it is not necessary to shut down the sensor ICs 60, 61, and thus the detected steering torque value τ is held only during a period in which the malfunction diagnosis signals Sd are output from the sensor ICs 60, 61. That is, the controller 5 holds the detected steering torque value τ at least during a period in which the malfunction diagnosis signal Sd is output from the torque sensor 6.

In the above-described embodiments, the controller 5 executes the normal control and the backup control. However, the control that is executed by the controller 5 is not limited to the normal control and the backup control. The controller 5 may be execute any control as long as the controller 5 executes the first control of controlling driving of the motor 30 while continuously executing the updating of the detected steering torque value τ in a predetermined sampling cycle and the second control of controlling driving of the motor 30 while alternately executing the periodic updating and holding of the detected steering torque value τ.

In the above-described embodiments, the torque differential compensation value I2*, the damping compensation value I3*, and the steering return compensation value I4* are described as examples of the compensation value for the basic current command value I1*. However, other compensation values may be used.

In the above-described embodiments, the microcomputer 51 has the torque computing unit 70. However, each of the sensor ICs 60, 61 may have a torque computing unit. In this case, the control unit is formed of the torque computing units of the sensor ICs 60, 61 and the microcomputer 51.

In the above-described embodiments, a brushless motor is used as the motor 30. Alternatively, a brushed motor may be used as the motor 30. The electric power steering system 1 according to the above-described embodiments is an electric power steering system that applies assist torque to the steering shaft 21. However, the invention may be applied to, for example, an electric power steering system that applies assist force to the rack shaft 23.

What is claimed is:

1. An electric power steering system comprising:
    a motor that applies assist force to a steering mechanism of a vehicle;
    a torque sensor that outputs a detection signal corresponding to a steering torque applied to the steering mechanism; and
    a controller that controls driving of the motor to cause an output torque of the motor based on an assist command value, wherein
    the controller
        (i) computes a steering torque value based on the detection signal;
        (ii) computes the assist command value by providing compensation to a basic assist command value using a compensation value, the basic assist command value being calculated based on the steering torque value;
        (iii) switches a control mode between (a) a first control mode in which driving of the motor is controlled based on a steering torque value that is periodically updated continuously in a predetermined sampling cycle and (b) a second control mode in which driving of the motor is controlled based on at least a held steering torque value that is held from a previous periodic update, the controller executing the second control mode during a period when the steering torque value alternates between being periodically updated continuously and being held from a previous periodic update; and
        (iv) switches the compensation value between a compensation value that is used when the first control is being executed and a compensation value that is used when the second control is being executed.

2. The electric power steering system according to claim 1, wherein the controller further includes
    a torque differential compensation unit that computes, as the compensation value, a torque differential compensation value based on a torque differential value that is a first-order time differential value of the steering torque, and
    when the second control mode is being executed, the controller makes an absolute value of the torque differential compensation value smaller than the absolute value of the torque differential compensation value when the first control mode is being executed.

3. The electric power steering system according to claim 2, wherein the controller further includes
    a filter unit formed of a low-pass filter that removes a high-frequency component of the torque differential value, and the controller computes the torque differential compensation value based on a torque differential value obtained through a filtering process executed by the filter unit, and
    when the second control mode is being executed, the controller makes a cutoff frequency of the filter unit lower than a cutoff frequency of the filter unit when the first control mode is being executed.

4. The electric power steering system according to claim 1, wherein the controller further includes
    a damping compensation unit that computes, as the compensation value, a damping compensation value that suppresses the rotation of the motor more as an absolute value of an angular velocity of the motor becomes larger, and
    when the second control mode is being executed, the controller makes an absolute value of the damping compensation value larger than the absolute value of the damping compensation value when the first control mode is being executed.

5. The electric power steering system according to claim 4, wherein the controller further includes
    a steering return compensation unit that computes, as the compensation value, a steering return compensation value for returning a steering wheel of the vehicle to a neutral position, and
    when the second control mode is being executed, the controller makes an absolute value of the steering return compensation value larger than an absolute value of the steering return compensation value when the first control mode is being executed.

6. The electric power steering system according to claim 1, wherein:
    the controller computes the compensation value based on at least one map; and
    the controller switches the maps to change the compensation value depending on the control mode.

7. The electric power steering system according to claim 1, wherein:
    the torque sensor has two detectors that each output the detection signal;
    each of the two detectors is able to alternately output a malfunction diagnosis signal and the detection signal;
    when the two detectors are both operating properly, the controller (i) controls driving of the motor in the first control mode, and (ii) monitors whether a malfunction occurs in the two detectors based on a comparison between the detection signals output from the two detectors; and
    when a malfunction is detected in a first one of the detectors, the controller (i) causes a second detector, in which no malfunction is detected, to alternately output the detection signal and the malfunction diagnosis signal, (ii) controls driving of the motor in the second control mode at least during a period in which the malfunction diagnosis signal is output from the second detector, and (iii) monitors whether a malfunction occurs in the second detector based on the malfunction diagnosis signal.

8. The electric power steering system according to claim 1, wherein the controller controls driving of the motor in the second control mode if a malfunction is detected in the torque sensor.

9. The electric power steering system according to claim 8, wherein the held steering torque value is the steering torque value that is computed immediately before a power supply to the torque sensor is cut off.

10. The electric power steering system according to claim 1, wherein the controller controls driving of the motor in the second control mode during a period when the torque sensor outputs a malfunction diagnosis signal.

11. The electric power steering system according to claim 1, wherein the controller calculates the compensation value based on one or both of (i) a time differential value of the steering torque, and (ii) an angular velocity of the motor.

12. The electric power steering system according to claim 11, wherein the controller calculates the compensation value based on both of (i) the time differential value of the steering torque, and (ii) the angular velocity of the motor.

13. The electric power steering system according to claim 12, wherein the controller further calculates the compensation value based on (iii) a rate of change in the basic assist command value.

14. The electric power steering system according to claim 1, wherein the basic assist command value is further calculated based on a detected vehicle speed.

15. The electric power steering system according to claim 1, wherein the steering torque value changes abruptly in the period when the steering torque value alternates between being periodically updated continuously and being held from a previous periodic update.

16. The electric power steering system according to claim 1, wherein a time differential value of the steering torque value changes abruptly in the period when the steering torque value alternates between being periodically updated continuously and being held from a previous periodic update.

* * * * *